(12) United States Patent
Belsarkar et al.

(10) Patent No.: US 12,437,774 B2
(45) Date of Patent: Oct. 7, 2025

(54) AUDIO EVENT ANALYSIS, CLASSIFICATION, AND DETECTION SYSTEM

(71) Applicant: Robert Bosch GmbH, Stuttgart (DE)

(72) Inventors: Ajit Belsarkar, Lancaster, PA (US); Jacob A. Gallucci, Mechanicsburg, PA (US); Irtsam Ghazi, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 301 days.

(21) Appl. No.: 18/054,015

(22) Filed: Nov. 9, 2022

(65) Prior Publication Data

US 2024/0153526 A1     May 9, 2024

(51) Int. Cl.
| | |
|---|---|
| *G10L 25/57* | (2013.01) |
| *H04N 7/18* | (2006.01) |
| *H04N 23/69* | (2023.01) |
| *H04R 1/02* | (2006.01) |
| *H04R 1/04* | (2006.01) |
| *H04R 1/40* | (2006.01) |
| *H04R 3/00* | (2006.01) |
| *H04R 29/00* | (2006.01) |
| *G06V 20/40* | (2022.01) |
| *G08B 21/18* | (2006.01) |

(52) U.S. Cl.
CPC ............. *G10L 25/57* (2013.01); *H04N 7/183* (2013.01); *H04N 23/69* (2023.01); *H04R 1/028* (2013.01); *H04R 1/04* (2013.01); *H04R 1/406* (2013.01); *H04R 3/005* (2013.01); *H04R 29/005* (2013.01); *G06V 20/44* (2022.01); *G06V 20/46* (2022.01); *G06V 2201/10* (2022.01); *G08B 21/18* (2013.01)

(58) Field of Classification Search
CPC .......... G06F 16/683; G06F 16/68; G06F 16/40
USPC ............................................................. 700/94
See application file for complete search history.

(56) References Cited

U.S. PATENT DOCUMENTS

| | | | |
|---|---|---|---|
| 7,348,895 B2 | 3/2008 | Lagassey | |
| 8,319,620 B2 | 11/2012 | Usher et al. | |
| 9,870,764 B2 | 1/2018 | Marti et al. | |
| 10,431,242 B1* | 10/2019 | Médioni | .................. G10L 15/22 |
| 11,659,217 B1* | 5/2023 | Mahyar | ............ H04N 21/23418 |
| | | | 725/116 |
| 2002/0097885 A1 | 7/2002 | Birchfield et al. | |
| 2006/0125654 A1 | 6/2006 | Liao et al. | |
| 2006/0227237 A1 | 10/2006 | Kienzle et al. | |

(Continued)

OTHER PUBLICATIONS

Invitation to Pay Additional Fees issued in Application No. PCT/EP2023/079749 dated Feb. 2, 2024 (16 pages).

*Primary Examiner* — Alexander Krzystan
(74) *Attorney, Agent, or Firm* — Michael Best & Friedrich LLP

(57) ABSTRACT

Systems and methods for audio event detection. One example provides an event detection system comprising a plurality of audio devices. Each of the plurality of audio devices is configured to be communicatively coupled to a server and includes an electronic processor. The electronic processor is configured to detect, via a microphone, audio, and determine an audio event within the audio. The electronic processor is configured to receive an image from a camera, associate the image data with the audio event to generate event metadata, and transmit the event metadata, the audio, and the image to the server.

18 Claims, 7 Drawing Sheets

(56) References Cited

U.S. PATENT DOCUMENTS

| | | | |
|---|---|---|---|
| 2008/0243332 A1 | 10/2008 | Basir et al. | |
| 2009/0157593 A1* | 6/2009 | Hayashi | G06Q 10/10 |
| 2019/0206134 A1* | 7/2019 | Devam | G06F 3/011 |
| 2021/0289168 A1 | 9/2021 | Glükert et al. | |
| 2022/0345543 A1* | 10/2022 | Oleinikov | G06F 16/313 |
| 2024/0007744 A1* | 1/2024 | Muthiah | H04N 23/90 |

* cited by examiner

AUDIO EVENT ANALYSIS, CLASSIFICATION, AND DETECTION SYSTEM

BACKGROUND

Embodiments, examples, and aspects relate to, among other things, systems and methods for audio event detection.

SUMMARY

Multimodal audio and video analytics devices described herein provide, among other things, for the automatic analysis and detection of events. For example, an audio device receives audio of a surrounding area. The audio device analyzes the audio to detect an event occurring in the surrounding area. Video of the area is associated with the audio event such that an operator of the audio and video analytics devices has a more complete picture of the event, including both video and sound.

In some instances, a monitoring system includes multiple audio and video analytics devices. Accordingly, a parent or hub device may be provided to receive audio events and their associated video data from the devices within the monitoring system. The parent device may aggregate the audio event and distribute the audio events to a server. An operator of the monitoring system may then access the individual audio events and their respective video at the server.

Additionally, in some instances, a camera included in the monitoring system may face away from a location of a detected audio event. In such an instance, the audio device that detects the audio event may control the camera to move it so that the view of the camera includes or is directed towards the location of the audio event, to help ensure that the audio event has associated video data. The monitoring system may perform additional actions in response to a detected audio event, such as initiating an alarm.

One example provides an event detection system comprising a plurality of audio devices. Each of the plurality of audio devices is configured to be communicatively coupled to a server and includes an electronic processor. The electronic processor is configured to detect, via a microphone, audio, and determine an audio event within the audio. The electronic processor is configured to receive an image from a camera, associate the image data with the audio event to generate event metadata, and transmit the event metadata, the audio, and the image to the server.

Another example provides a method for event detection in a plurality of audio devices. The method includes detecting, via a microphone included in a first audio device and with an electronic processor, audio, and determining, with the electronic processor, an audio event within the audio. The method includes receiving, with the electronic processor, an image from a camera, associating, with the electronic processor, the image with the audio event to generate event metadata, and transmitting, with the electronic processor, the event metadata, the audio, and the image to a server.

Other features, aspects, and benefits of various embodiments will become apparent by consideration of the detailed description and accompanying drawings.

DETAILED DESCRIPTION

Figure 1:
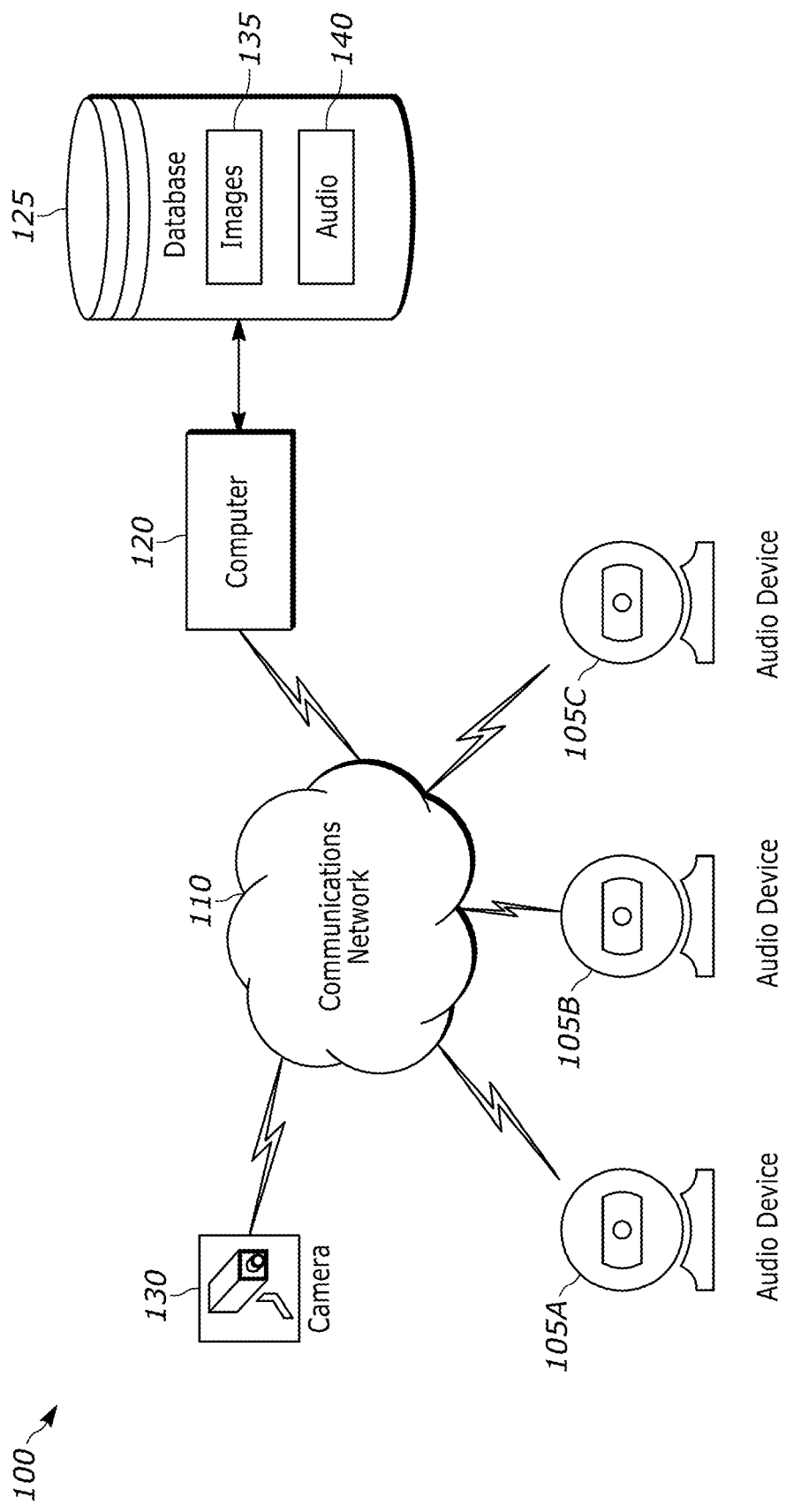
FIG. 1 illustrates an audio event detection system for classifying audio events according to one example.

One or more examples are described and illustrated in the following description and accompanying drawings. These examples are not limited to the specific details provided herein and may be modified in various ways. Other examples may exist that are not described herein. For example, a device or structure that is "configured" in a certain way is configured in at least that way but may also be configured in ways that are not listed.

It should also be noted that a plurality of hardware and software based devices, as well as a plurality of different structural components may be utilized in various implementations. Aspects, features, and instances may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one instance, the aspects may be implemented in software (for example, stored on non-transitory computer-readable medium) executable by one or more processors. Thus, a plurality of hardware and software based devices, as well as a plurality of different structural components may be utilized to implement various aspects and examples. For example, "control units" and "controllers" described in the specification can include one or more electronic processors, one or more memory modules including a non-transitory computer-readable medium, one or more input/output interfaces, and various connections (for example, a system bus) connecting the components. It should be understood that although certain drawings illustrate hardware and software located within particular devices, these depictions are for illustrative purposes only. Unless the context clearly indicates otherwise, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computer or device or may be distributed among different computers or devices connected by one or more networks or other suitable communication links.

Examples described herein may be implemented as non-transitory, computer-readable medium storing instructions executable by one or more electronic processors to perform the described functionality. As used in the present application, "non-transitory computer-readable medium" comprises all computer-readable media but does not include a transitory, propagating signal. Accordingly, non-transitory computer-readable medium may include, for example, a hard disk, a CD-ROM, an optical storage device, a magnetic storage device, ROM (Read Only Memory), RAM (Random Access Memory), register memory, a processor cache, other memory and storage devices, or combinations thereof.

For ease of description, some or all of the example systems presented herein are illustrated with a single exemplar of each of its component parts. Some examples may not describe or illustrate all components of the systems. Other instances may include more or fewer of each of the illustrated components, may combine some components, or may include additional or alternative components.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections.

Unless the context of their usage unambiguously indicates otherwise, the articles "a" and "an" should not be interpreted as meaning "one" or "only one." Rather these articles should be interpreted as meaning "at least one" or "one or more."

Relational terms, for example, first and second, top and bottom, and the like may be used herein solely to distinguish one entity or action from another entity or action without necessarily requiring or implying any actual such relationship or order between such entities or actions.

In some examples, method steps are conducted in an order that is different from the order described.

FIG. 1 illustrates an audio event detection system 100 for classifying audio events. The examples disclosed herein relate to detecting, classifying, and analyzing audio events of audio devices included in the audio event detection system 100. In the example illustrated, the audio event detection system 100 includes a first audio device 105A, a second audio device 105B, a third audio device 105C, a communications network 110, a computer 120, a database 125, and a camera 130. In the following description, when explaining how a single audio device functions, a reference to audio device 105 is used. It is not necessary, however, that the audio devices 105A through 105C be identical. It should be understood that audio devices described herein refer to a device having audio-detection capabilities. For example, an audio device may be a camera having an integrated microphone. In some examples, the audio event detection system 100 includes more or fewer audio devices 105 and more or fewer cameras 130 than the number shown in FIG. 1.

The audio devices 105A through 105C communicate with the computer 120 over the communications network 110. The communications network 110 may be wired, wireless, or a combination thereof. All or parts of the communications network 110 may be implemented using various existing networks, for example, a cellular network, a Long Term Evolution (LTE) network, a 5G network, the Internet, a Bluetooth™ network, a wireless local area network (for example, Wi-Fi), a public switched telephone network, and others. The communications network 110 may also include future developed networks. Also, in some embodiments, the communications network 110 includes a combination of networks. For example, the first audio device 105A may communicate over a LTE network, while the second audio device 105B may communicate over Wi-Fi.

In one example, the computer 120 is a computer or computer program which manages access to a centralized resource or service in a network. The computer 120 is communicatively connected to the database 125. In some examples the database 125 includes a memory (for example, a non-transitory, machine readable medium) capable of storing images 135 captured by the camera 130 and audio 140 received from the audio devices 105A through 105C via the computer 120. In some examples, the computer 120 includes a display and a user interface capable of receiving a plurality of user inputs.

Figure 2:
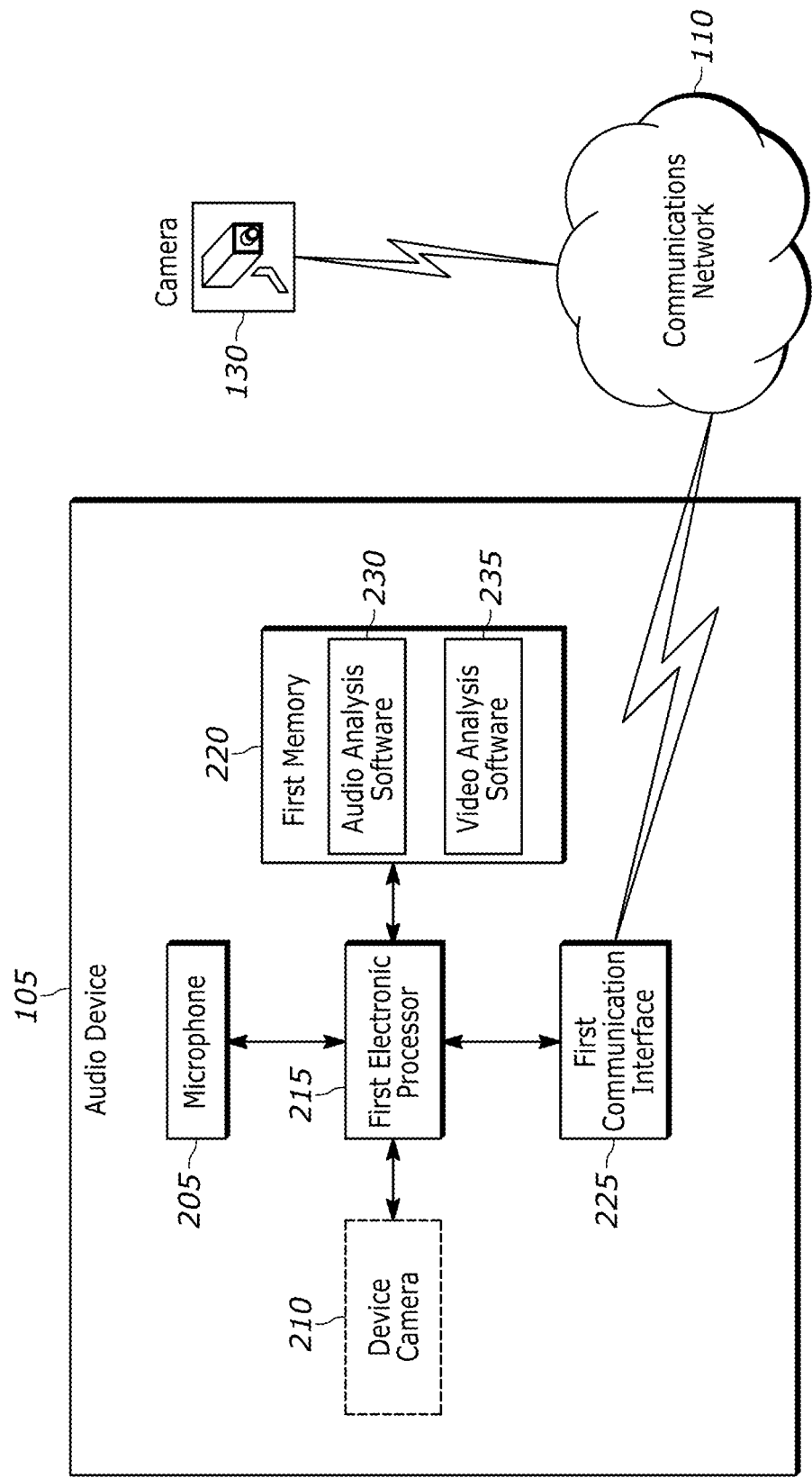
FIG. 2 is a block diagram of a server of the audio event detection system of FIG. 1 according to one example.

FIG. 2 is a block diagram of an example audio device 105 of FIG. 1. The audio device 105 includes, among other things, a microphone 205, a first electronic processor 215, a first memory 220, a first communication interface 225, and, optionally, a device camera 210. In some instances, the audio device 105 also includes a plurality of electrical and electronic components that provide power, operational control, and protection to the components and modules within the audio device 105. The first electronic processor 215, the first memory 220, the microphone 205, the first communication interface 225, and the device camera 210, as well as the other various modules, are connected by one or more control or data buses.

The first electronic processor 215 obtains and provides information (for example, from the first memory 220 and the first communication interface 225), and processes the information by executing one or more software instructions or modules capable of being stored, for example, in the first memory 220). The software can include firmware, one or more applications, program data, filters, rules, one or more program modules, and other executable instructions. In particular, the first electronic processor 215 executes instructions stored in the first memory 220 to perform the methods described herein. The first memory 220 can include one or more non-transitory computer-readable media and includes a program storage area and a data storage area. The program storage area and the data storage area can include combinations of different types of memory, for example, read-only memory ("ROM"), random access memory ("RAM"), electrically erasable programmable read-only memory ("EEPROM"), flash memory, or other suitable digital memory devices.

The device camera 210, when included in the audio device 105, captures image and/or video of a viewpoint of the audio device 105 (e.g., a view of a location). In some instances, the audio device 105 does not include an internal device camera 210, but may instead receive images and/or video from the camera 130 via the communications network 110. The microphone 205 captures audio representative of the captured location. In some situations, the microphone 205 is a micro electro-mechanical system ("MEMS") sensor. In some examples, the audio device 105 includes multiple MEMS sensors which combined form the microphone 205. While shown in FIG. 2 as internal to the audio device 105, in some implementations, the microphone 205 is external to but communicatively connected to the audio device 105. The first electronic processor 215 is communicatively connected to the microphone 205, the first memory 220, the first communication interface 225, and the device camera 210.

In some examples, the first memory 220 stores an audio analysis software 230 and a video analysis software 235.

The audio analysis software 230 is implemented by the first electronic processor 215 to analyze audio (for example, audio captured by the microphone 205 or an external device separate from the audio devices 105A through 105C) to, among other things, determine types of sounds within the audio. Accordingly, the audio analysis software 230 receives data, including audio, from the microphone 205 and outputs audio information relating to the analyzed audio. For example, based on the received audio, the audio analysis software 230 may determine a gunshot, glass breaking, a break-in, or other noises present within the audio. The first electronic processor 215 may determine an event occurrence based on the determined type of sound (e.g., a sound event). Accordingly, examples described herein referring to an audio event refers to a particular sound of interest identified within audio.

In one example, the video analysis software 235 is executed by the first electronic processor 215 to analyze images (for example, images 135 and/or video captured by the camera 130 or device camera 210 and stored in the database 125) to, among other things, identify and determine features (such as objects of interest) within the images. In combination with the audio analysis software 230, the video analysis software 235 may capture images associated with an event occurrence and communicate with the first electronic processor 215 to associate the images and the audio of the event occurrence. Particularly, in some instances, metadata is generated that associates images and audio of a detected event. When the audio analysis software 230 determines an event occurrence based on the received audio, such as detecting the sound of glass breaking, the audio analysis software 230 transmits an indication of the event occurrence and the event type (e.g., the output of the audio analysis software 230) to the first electronic processor 215. The first electronic processor 215 may associate the glass breaking event with corresponding video of the glass breaking. Accordingly, an operator may access an event and its corresponding video and audio.

In some implementations, the audio analysis software 230 and the video analysis software 235 are machine-learning models pre-trained to identify particular features within provided data. Example machine learning techniques include regression learning, classification learning, clustering analysis, density estimation, support vector machines, artificial neural networks, decision tree learning, and the like.

Figure 3:
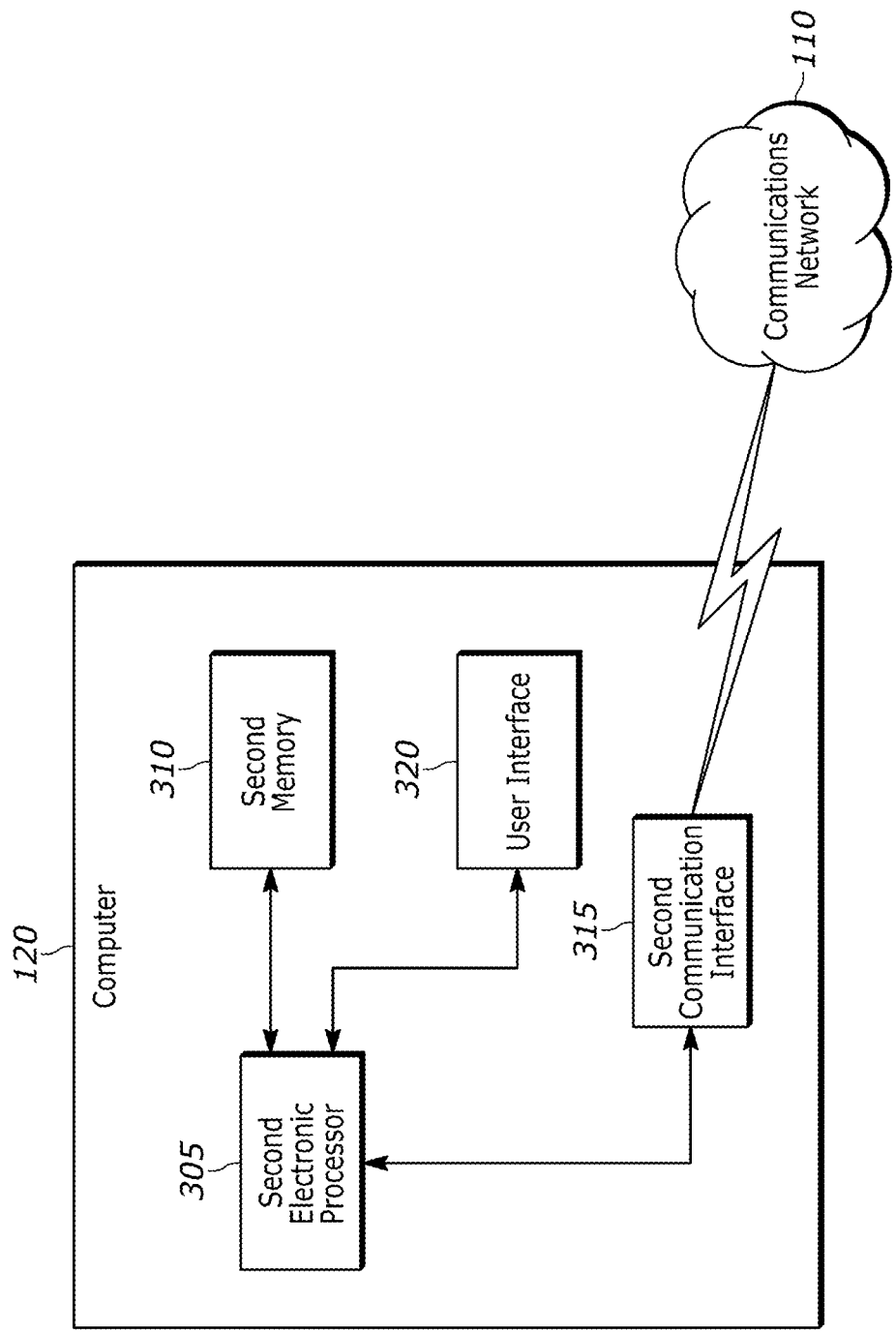
FIG. 3 is a block diagram of an audio device of the audio event detection system of FIG. 1 according to one example.

FIG. 3 is a block diagram of an example computer 120 of FIG. 1. The computer 120 includes, among other things, a second electronic processor 305 (such as a programmable electronic microprocessor, microcontroller, or similar device), a second memory 310 (for example, a non-transitory, machine readable medium), a second communication interface 315, and a user interface 320. In some instances, the computer 120 also includes a plurality of electrical and electronic components that provide power, operational control, and protection to the components and modules within the computer 120. The second electronic processor 305, the second memory 310, the second communication interface 315, and the user interface 320, as well as the other various modules are connected by one or more control or data buses. It should be understood that the second electronic processor 305, the second memory 310, and the second communication interface 315 include similar components to those described above with respect to the first electronic processor 215, the first memory 220, and the first communication interface 225, respectively, and perform similar functions but need not be identical. The second electronic processor 305 receives user inputs from the user interface 320 and may be used to receive inputs related to audio and video captured by the audio devices 105A through 105C and the camera 130.

While the audio analysis software 230 and the video analysis software 235 are described with respect to the audio device 105, in some instances, the audio analysis software 230 and/or the video analysis software 235 are instead located within the computer 120. For example, the audio device 105 may transmit captured audio and video to the computer 120. The computer 120 then implements the video analysis software 235 using captured video and implements the audio analysis software 230 using captured audio. It should also be understood that the functionalities of the computer 120 may be spread over multiple devices and need not solely be performed within the computer 120.

Figure 4:
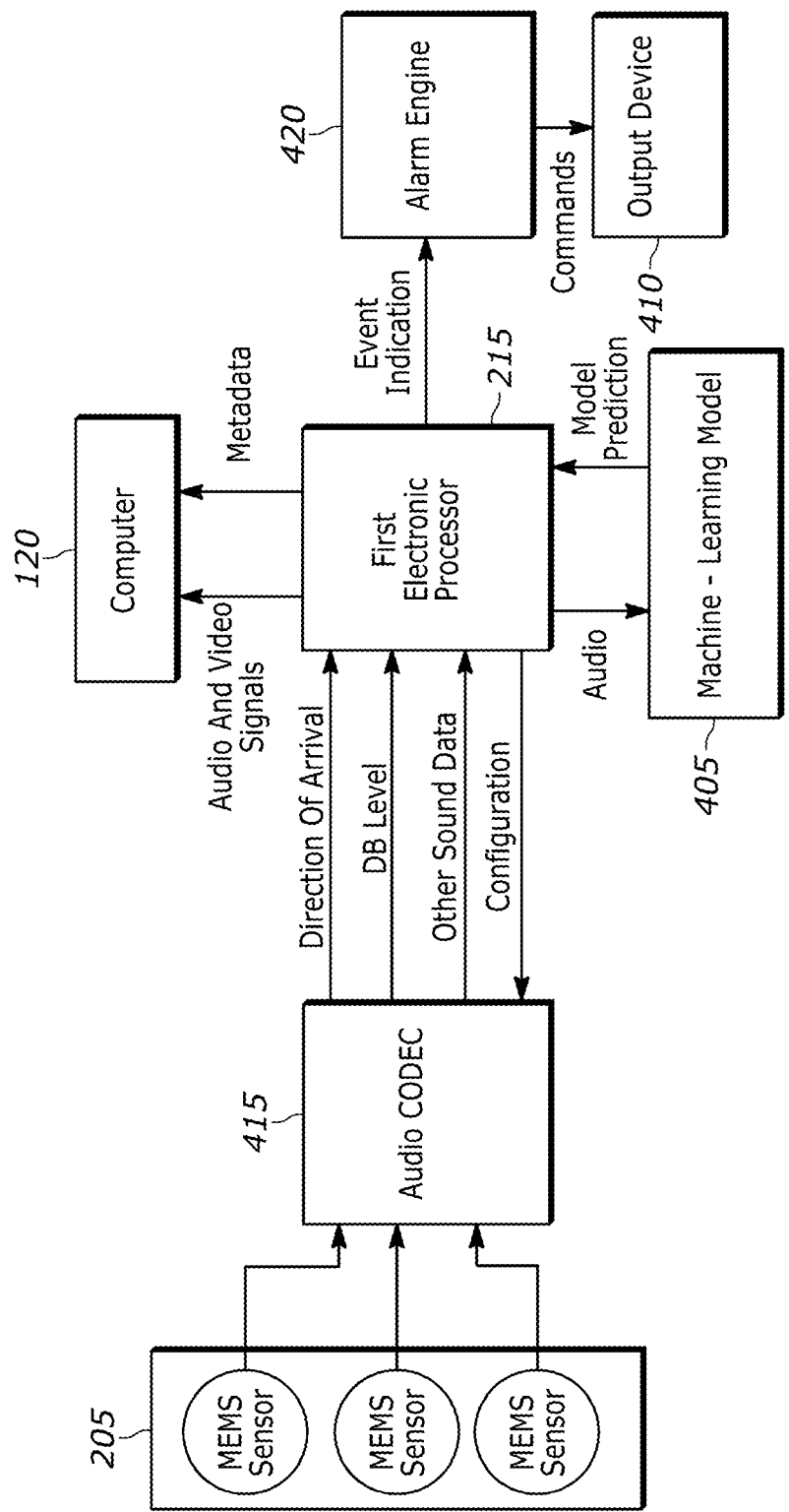
FIG. 4 is a block diagram of the audio event detection system of FIG. 1 according to another example.

FIG. 4 is an example block diagram of the audio event detection system 100, including a machine learning model. The audio event detection system 100 includes a plurality of MEMS sensors forming a microphone 205. The audio codec 415 and the alarm engine 420 shown in FIG. 4 may be software implemented by the first electronic processor 215, but are illustrated separately for purposes of clarity.

The microphone 205 is positioned to detect audio surrounding the audio device 105. Particularly, in the example of FIG. 4, the microphone 205 includes a plurality of MEMS sensors to detect sound surrounding the audio device 105. In one instance, each MEMS sensor is configured to detect sound from a particular direction or range of directions from the audio device 105. For example, a first MEMS sensor is associated from a first direction (e.g., from 0 degrees to 120 degrees), a second MEMS sensor is associated with a second direction (e.g., from 120 degrees to 240 degrees), and a third MEMS sensor is associated with a third direction (e.g., from 240 degrees to 360 degrees). However, the microphone 205 may be composed of more or fewer MEMS sensors.

In the example shown in FIG. 4, the audio codec 415 processes the audio provided from the microphone 205. For example, the audio codec 415 may perform noise reduction, apply frequency filtering, perform echo cancellation, compress the audio, and perform expansion and level limiting operations. The audio codec 415 determines, among other things, a direction of the audio, a magnitude (in decibels) of the audio, and other metadata associated with the audio, and provides the direction of the audio, the magnitude of the audio, and the other audio metadata (and, in some instances, the audio itself) to the first electronic processor 215. In some instances, processing the audio signals includes the audio codec 415 selecting and applying a filter to received sound. Additionally, in some implementations, the audio codec 415 sets a gain value of the microphone 205 to ensure the audio from the microphone 205 is observable. Accordingly, the audio codec 415 may condition received audio for processing by the first electronic processor 215. In some instances, the first electronic processor 215 provides a distance between each of the MEM sensors to the audio codec 415 to assist with triangulation of the audio. Additionally, the first electronic processor 215 may set, via the audio codec 415, a sampling rate of the audio.

Audio may be transferred from the audio codec 415 to the first electronic processor 215 over an I2S bus at the configured sampling rate and in the form of pulse-code modulation (PCM) data. The first electronic processor 215 analyzes the received audio to determine a type of the audio or an audio event (for example, determine a feature within the audio). Particularly, the first electronic processor 215 provides the audio to a trained machine-learning model 405 (for example, the audio analysis software 230). In some instances, the first electronic processor 215 provides both raw audio from the microphone 205 and processed audio from the audio codec 415 to the machine-learning model 405. The machine-learning model 405 determines whether a feature is present within the audio and a confidence of the feature. The particular feature (e.g., the type of the audio, the audio event), and the confidence level of the machine-learning model 405, are provided to the first electronic processor 215.

In some examples, the machine-learning model 405 transmits the event metadata, the audio associated with the audio event, and the image (or video) to the computer 120. The computer 120 stores the event metadata, the audio associated with the audio event, and the image within memory. The event metadata, the audio associated with the audio event, and the image data may be retrieved from the computer 120 for further analysis by a user via the computer 120.

In some implementations, the first electronic processor 215 associates the audio event with received images and/or video by generating event metadata. For example, the first electronic processor 215 receives the audio event from the machine-learning model 405, receives the audio from the microphone 205, and receives video from a camera 130. The first electronic processor 215 generates metadata that associates the audio, the type of the audio, and the video, therefore indicating that the audio, the type of the audio, and the video data are related. In some instances, the first electronic processor 215 generates a table including the audio, the type of the audio, the video, and a time at which the event occurred. The audio, the type of the audio, the video, and the metadata are provided to the computer 120 to be stored in the second memory 310.

In some instances, the first electronic processor 215 conditions or otherwise processes audio from the audio codec 415. For example, the first electronic processor 215 sets a gain value of the microphone 205, applies filters to the audio, adjusts a sensitivity of the microphone 205, and the like. As one example, the first electronic processor 215 selects a filter and applies the filter based on the detected sound and the direction of the detected sound. In another example, first electronic processor 215 adjusts the sensitivity of the microphone 205 based on an environment of the microphone 205. In some examples, when the microphone 205 is located in a noisy environment (i.e., an environment with a continuously high decibel level), the first electronic processor 215 automatically decreases the gain of the microphone 205. In other examples, when the microphone 205 is located in a quiet environment (i.e., an environment with a continuously low decibel level), the first electronic processor 215 automatically decreases the gain value of the microphone 205. Additionally, the first electronic processor 215 may select an acoustic overload point ("AOP") of the microphone 205 to avoid clipping of the audio.

In some examples, the first electronic processor 215 performs acoustic operations on audio from the microphone 205, such as beam formation and noise cancellation. For example, in some instances, a sound may be detected by each MEMS sensor in the microphone 205. Accordingly, as each MEMS sensor is situated in a different location, the sound will arrive at each MEMS sensor at a different time and from a different location relative to the respective MEMS sensor. In some instances, the first electronic processor 215 uses triangulation of the audio for each MEMS sensor to determine a location of the audio event relative to the microphone 205. Additionally, in some instances, the first electronic processor 215 associates the location of the audio event with a location within the field of view of the camera 130. The first electronic processor 215 may transmit a command to the camera 130 to steer the camera 130 (i.e., if the camera 130 is a pan/tilt/zoom ("PTZ") camera) in the direction of the location of the audio event.

In some examples, the first electronic processor 215 cancels or suppresses the audio associated with the audio event prior to providing the audio to an operator of the computer 120. For example, the first electronic processor 215 may determine whether speech is present within audio by implementing the audio analysis software 230. The presence of speech may be assessed by analyzing whether the audio include words and, phrases. Vocal frequency and vocal pitch may also be factors in the analysis. When speech is present, the first electronic processor 215 distorts the frequencies associated with the speech or adds noise to the speech to suppress the speech. In some implementations, the first electronic processor 215 detects the speech within the audio, inverts the speech by 180 degrees, and adds the inverted speech to the original audio to reduce or remove the speech within the audio.

The alarm engine 420 generates a command based on the type of the audio. For example, in response to the audio event, the alarm engine commands an output device 410 (e.g., a speaker communicatively connected to the first electronic processor 215) to provide an alarm. In other examples, the first electronic processor 215 may, among other things, provide an alert via a display, record audio via the microphone 205 and video via the camera 130 in the direction of the audio event, and activate a PTZ camera for automatic motion tracking. The first electronic processor 215 may set the various commands based on user inputs received from the computer 120. For example, when the type of the audio is a gunshot, the first electronic processor 215 may trigger an alarm notifying civilians near the location to evacuate the premises.

Additionally, the sensitivity of the alarm engine 420 may be adjusted to avoid false positives. For example, the alarm engine 420 may generate a command in response to the confidence level of the machine-learning model 405 exceeding a threshold. In some implementations, the first electronic processor 215 validates generated commands by observing image data from the camera 130. For example, when an audio event is detected, the first electronic processor 215 transmits a command to steer the camera 130 in the direction of the audio event. Once facing the location of the audio event, the camera 130 transmits video to the first electronic processor 215. The first electronic processor 215 implements the video analysis software 235 to detect features within the video. The first electronic processor 215 compares the features detected by the video analysis software 235 to the audio type detected by the audio analysis software 230 to validate the event. In some instances, the command is provided to the output device 410 only when the event is validated.

Figure 5:
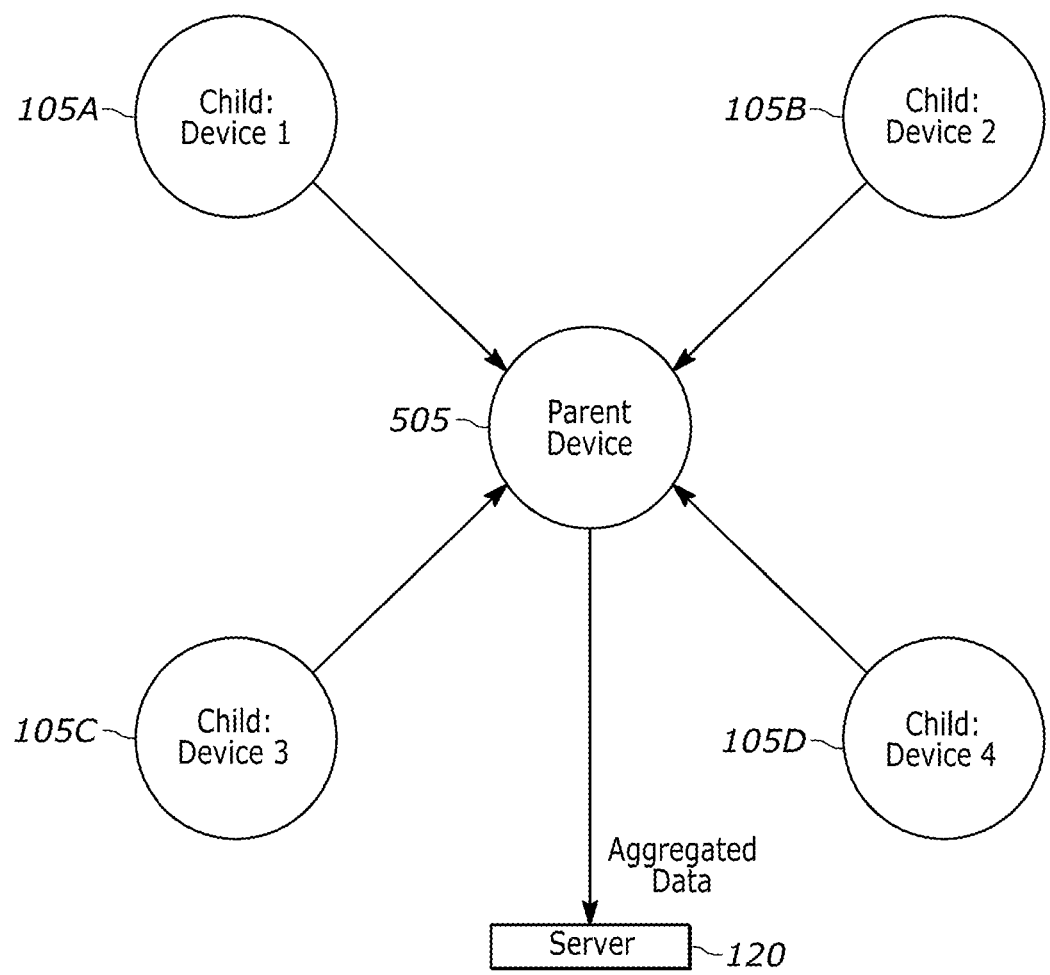
FIG. 5 is a block diagram of another audio event detection system including a parent device according to one example.

In some implementations, rather than providing audio, video, and generated metadata directly to the computer 120, the audio devices 105 instead provide the audio, video, and metadata to an intermediary parent device. FIG. 5 is a block diagram of an example event detection system 500. The event detection system 500 includes similar components to the audio event detection system 100, such as audio devices 105A through 105D (i.e., child devices 1 through 4) and the computer 120. The audio event detection system 500 also includes a parent device 505. The parent device 505 is communicatively connected to the audio devices 105A through 105D and the computer 120.

The parent device 505 receives the audio, video, and event metadata from each of the audio devices 105A through 105D. The parent device 505 aggregates the data received from each of the audio devices 105A through 105D. For example, the parent device 505 may compress the audio, the video, and the event metadata. In some instances, the parent device 505 collects data from each audio device 105 and combines the data into a single packet to provide to the computer 120. As another example, the parent device 505 receives a table from each audio device 105 including audio, video, and event metadata associated with an event detected by the respective audio device 105. The parent device 505 combines these tables into a single table provided to the computer 120.

Figure 6:
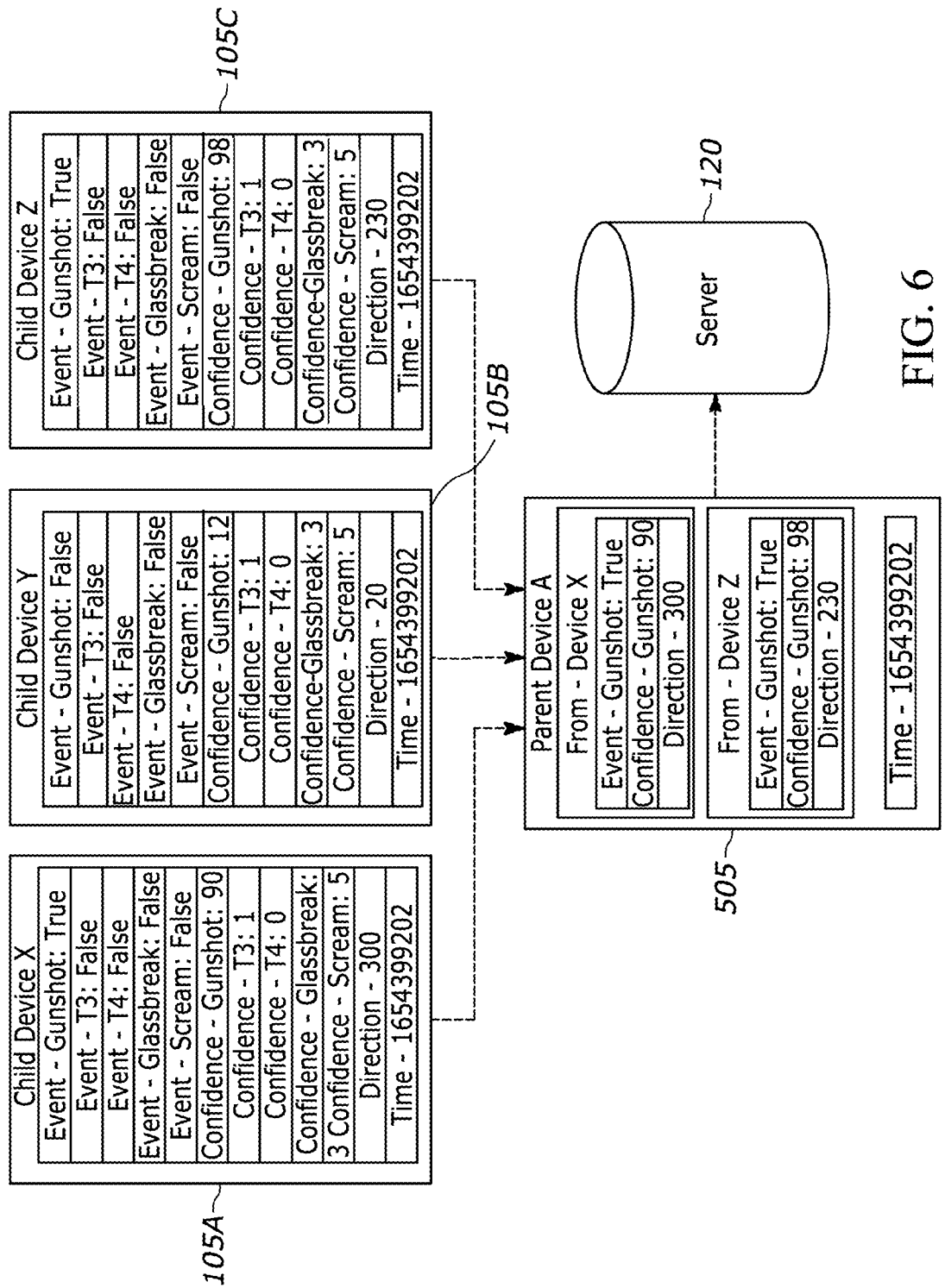
FIG. 6 is a block diagram of the parent device of FIG. 5 aggregating data from audio devices according to one example.

FIG. 6 provides one example of a parent device 505 aggregating data from audio devices. A first audio device 105A, a second audio device 105B, and a third audio device 105C each detect an event at the same time (e.g., time=1654399202). Each audio device 105A-105C determine whether the event is a gunshot, T3, T4, glass breaking, or a scream by implementing their respective machine-learning model 405. The first audio device 105A determines that the event is a gunshot with 90% confidence. Additionally, the first audio device 105A determines the direction of the event is 3000 relative to the first audio device 105A. The second audio device 105B does not determine that the audio event is one of the five provided audio events, having a low confidence value for each event. The third audio device 105C determines that the event is a gunshot with 98% confidence. Additionally, the third audio device 105C determines the direction of the event is 230° relative to the third audio device 105C.

The first audio device 105A, the second audio device 105C, and the third audio device 105C each transmit the results of their respective machine-learned model 405 (e.g., the event type), the direction of the event, and the time of the event to the parent device 505. The parent device 505 aggregates the data from each audio device 105A-105C. For example, as the second audio device 105B was not successful in determining a type of the event, the parent device 505 ignores the data received from the second audio device 105B. Additionally, the parent device 505 only includes the results of the machine-learned models 405 where the confidence for the respective audio device 105A-105C was above a threshold value. Accordingly, the parent device 505 only includes the confidence level of the gunshot event type. The aggregated output of the parent device 505 includes the determined event type by the first audio device 105A and the third audio device 105C, the confidence of the respective machine-learned models 405, the direction of the event relative to the first audio device 105A and the third audio device 105C, and the time of the event. The aggregated result of the parent device 505 is not limited to only this example, and may include more or less information.

Figure 7:
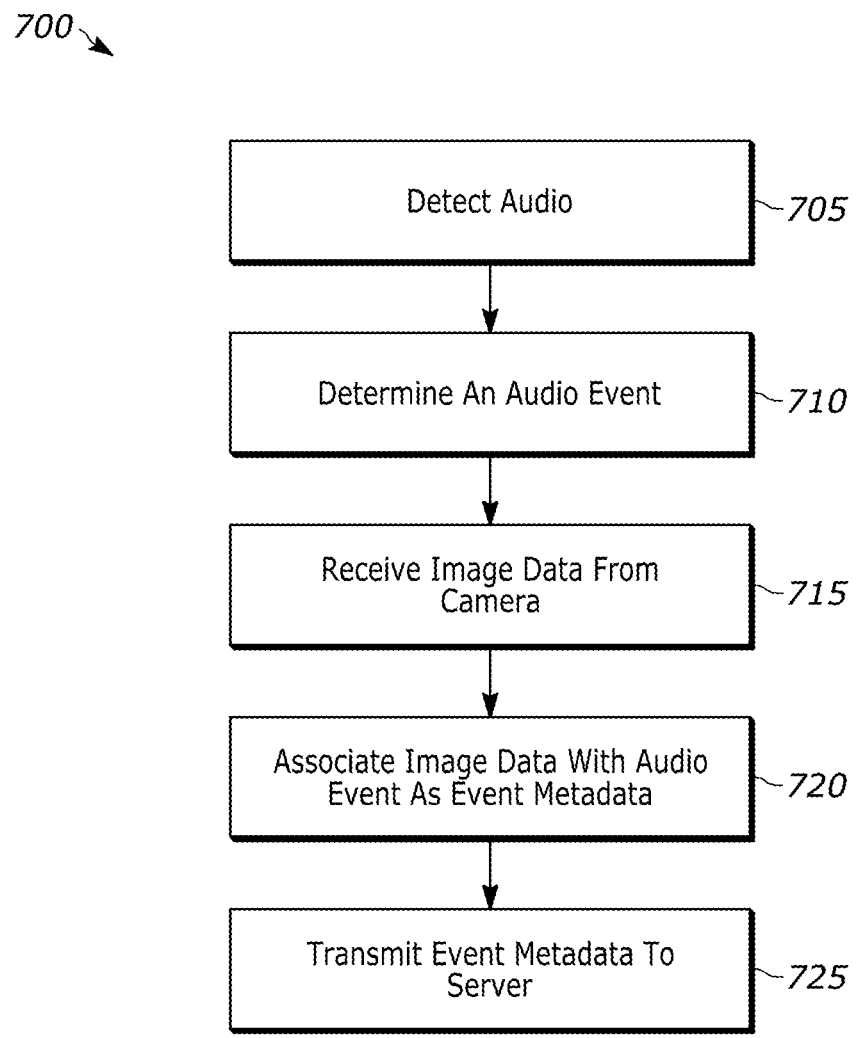
FIG. 7 is a flow chart of a method for classifying audio events according to one example.

FIG. 7 illustrates an example flowchart of method 700 for classifying audio events. The method 700 is described as being executed by the first electronic processor 215. However, in some examples, aspects of the method 700 are performed by another device. For example, the method 700 may be performed by the second electronic processor 305 or the first electronic processor 215 in conjunction with the second electronic processor 305. Additionally, while a particular order is provided, in some examples, the steps of the method 700 may be performed in a different order.

At step 705, the first electronic processor 215 detects, via the microphone 205, audio. For example, the microphone 205 transmits audio of a surrounding environment to the first electronic processor 215. At step 710, the first electronic processor 215 determines an audio event based on the audio. For example, the first electronic processor 215 implements the audio analysis software 230 to detect an audio feature within the audio. The audio feature is classified as an audio type (e.g., the audio event). At step 715, the first electronic processor 215 receives an image from the camera 130.

At step 720, the first electronic processor 215 associates the received image with the audio event and generates event metadata for the detected audio event, as previously described. At step 725, the first electronic processor 215 transmits the event metadata, the audio, and the image to the computer 120.

In other examples, the audio event detection system 100 includes a calibration mode. The calibration mode provides verification that audio event detection system 100 is functioning properly. The audio event detection system 100 may be placed in the calibration mode based on a user input received by the computer 120. A test sound, with a known decibel level and known distance from the microphone 205, is provided by an external device. The test sound is detected by the microphone 205 and is provided to the audio analysis software 230. The first electronic processor 215 determines that the audio event detection system 100 is working properly when the output of the audio analysis software 230 match the known decibel level and the known distance from the microphone 205. When the output of the audio analysis software 230 does not match the known decibel level and the known distance from the microphone 205, the first electronic processor 215 determines that calibration is required. The first electronic processor 215 may notify an operator of the audio event detection system 100 by transmitting an alert to the computer 120 indicative of the need for calibration. Calibration of the audio event detection system 100 may include adjusting the sensitivity of the microphone 205, clearing debris obstructing the microphone 205, and replacing a faulty microphone 205.

An operator may query past image and audio associated with previous audio events via the computer 120. When the computer 120 receives data associated with an event, the first electronic processor 215 updates a cache within the computer 120. The cache includes a list of previous detected events and commands provided in response to the events. In some instances, the operator queries the cache for previous audio events above a selected confidence threshold. In some examples, the operator provides feedback to the machine-learning model 405 by confirming the detection of events. For example, an operator may provide an input indicating that the detection of a gunshot was incorrect. The machine-learning model 405 is updated based on the feedback from the operator.

Thus, examples provide, among other things, systems and methods for event detection. Various features, advantages, and examples are set forth in the following claims.

What is claimed is:

1. An event detection system comprising:
   a plurality of audio devices, each of the plurality of audio devices configured to be communicatively coupled to a server and including,
      a first memory;
      a first electronic processor configured to:
         detect, via a microphone, audio;
         determine an audio event within the audio;
         receive an image from a camera; and
         associate the image data with the audio event to generate event metadata; and a parent device communicatively coupled to each of the audio devices, the parent device including a second memory, and a second electronic processor configured to:
- receive the event metadata from each of the plurality of audio devices;
- receive, from each audio device, a confidence level associated with the event metadata;
- compare, for each event metadata, the confidence level associated with the event metadata to a threshold value;
- add, for each event metadata and in response to the confidence level for the event metadata being greater than or equal to the threshold value, the event metadata to an aggregated event metadata;
- ignore, for each event metadata and in response to the confidence level for the event metadata being less than the threshold value, the event metadata; and
- transmit the aggregated event metadata to the server.

2. The event detection system of claim 1, wherein the electronic processor is further configured to:
- perform an audio processing operation on the audio to generate a processed audio, and
- provide the processed audio via an output device connected to the electronic processor,
- wherein the audio processing operation is one selected from the group consisting of a noise cancellation operation, an echo cancellation operation, a far field expansion operation, an impulse sound compression operation, and an audio equalization operation.

3. The event detection system of claim 1, wherein the event metadata includes a table including the audio event, the associated image, and a time at which the audio event occurred.

4. The event detection system of claim 1, wherein the electronic processor is further configured:
- determine a location of the audio event; and
- steer the camera to face the location.

5. The event detection system of claim 4, wherein the camera is within a housing of a first audio device of the plurality of audio devices.

6. The event detection system of claim 1, wherein the electronic processor is further configured to:
- generate, based on the audio event, an alert; and
- provide, via an output device connected to the electronic processor, an alarm indicative of the alert;
- wherein the alert is included in the event metadata.

7. The event detection system of claim 6, wherein the electronic processor is further configured to:
- update a cache associated with the respective audio device based on the alert, wherein the cache includes a list of alerts associated with previous alarms; and
- transmit the data within the cache to the server.

8. The event detection system of claim 1, wherein the electronic processor is further configured to:
- detect a test sound provided by an external device; and
- calibrate the determination of audio events using the test sound.

9. The event detection system of claim 1, wherein the electronic processor is further configured to determine the audio event by:
- applying a machine learning model to the audio.

10. A method for event detection in a plurality of audio devices, the method comprising:
- detecting, via a microphone included in a first audio device and with an electronic processor, audio;
- determining, with the electronic processor, an audio event within the audio;
- receiving, with the electronic processor, an image from a camera;
- associating, with the electronic processor, the image with the audio event to generate event metadata;
- receiving, with a parent device connected to the electronic processor, event metadata from the plurality of audio devices;
- receiving, via the parent device, a confidence level associated with the event metadata from each audio device;
- comparing, via the parent device, the confidence level associated with the event metadata to a threshold value;
- adding, via the parent device, the event metadata to an aggregated event metadata in response to the confidence level for the event metadata being greater than or equal to the threshold value;
- ignoring, via the parent device, the event data in response to the confidence level for the event metadata being less than the threshold value; and
- transmitting, with the parent device, the aggregated event metadata to the server.

11. The method of claim 10, further comprising:
- performing, with the electronic processor, an audio processing operation on the audio to generate a processed audio; and
- providing, with an output device connected to the electronic processor, the processed audio.

12. The method of claim 10, wherein the event metadata includes a table including the audio event, the associated image, and a time at which the audio event occurred.

13. The method of claim 10, further comprising:
- determining, with the electronic processor, a location of the audio event; and
- steering, with the electronic processor, the camera to face the location.

14. The method of claim 13, wherein the camera is within a housing of the first audio device.

15. The method of claim 10, further comprising:
- generating, based on the audio event and with the electronic processor, an alert; and
- providing, via an output device connected to the electronic processor, an alarm indicative of the alert,
- wherein the alert is included in the event metadata.

16. The method of claim 15, further comprising:
- updating, with the electronic processor, a cache associated with the first audio device based on the alert, wherein the cache includes a list of alerts associated with previous alarms; and
- transmitting, with the electronic processor, the data within the cache to the server.

17. The method of claim 10, further comprising:
- detecting, with the electronic processor, a test sound provided by an external device; and
- calibrating, with the electronic processor, the determination of audio events using the test sound.

18. The method of claim 10, wherein determining the audio event includes applying, with the electronic processor, a machine learning model to the audio.

* * * * *